(12) United States Patent
Wu

(10) Patent No.: US 11,954,116 B2
(45) Date of Patent: Apr. 9, 2024

(54) VISUAL DATA OPERATION METHOD, SYSTEM, AND DEVICE, AND MEDIUM

(71) Applicant: SHANGHAI LILITH TECHNOLOGY CORPORATION, Shanghai (CN)

(72) Inventor: Di Wu, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 15 days.

(21) Appl. No.: 17/777,396

(22) PCT Filed: Sep. 11, 2020

(86) PCT No.: PCT/CN2020/114738
§ 371 (c)(1),
(2) Date: May 17, 2022

(87) PCT Pub. No.: WO2021/128955
PCT Pub. Date: Jul. 1, 2021

(65) Prior Publication Data
US 2022/0405300 A1    Dec. 22, 2022

(30) Foreign Application Priority Data
Dec. 27, 2019  (CN) .......................... 201911376869.5

(51) Int. Cl.
*G06F 16/00* (2019.01)
*G06F 16/22* (2019.01)
(Continued)

(52) U.S. Cl.
CPC .......... *G06F 16/26* (2019.01); *G06F 16/2246* (2019.01); *G06F 16/2379* (2019.01); *A63F 13/60* (2014.09)

(58) Field of Classification Search
CPC .. G06F 16/26; G06F 16/2246; G06F 16/2379; G06F 16/2428; G06F 16/284; A63F 13/60; A63F 13/352
See application file for complete search history.

(56) References Cited

U.S. PATENT DOCUMENTS 10,599,337 B2 *  3/2020  Yang .................... G06F 16/182
10,956,392 B1 *  3/2021  Atkin .................. G06F 16/2246
(Continued)

FOREIGN PATENT DOCUMENTS

CN        1849602       10/2006
CN      102521404        6/2012
(Continued)

*Primary Examiner* — Noosha Arjomandi
(74) *Attorney, Agent, or Firm* — Amster, Rothstein & Ebenstein LLP

(57) ABSTRACT

A visual data operation method, system, and device, and a medium for one or more pieces of data, creating one or more corresponding value objects, and arranging the one or more value objects as a tree structure; and for the one or more value objects, creating corresponding database records, and defining fields of the database records by the one or more value objects. Data and database records correspond to each other and are mutually converted by using value objects. A developer only needs to arrange the value objects as a tree structure, and a system can automatically complete remaining data operations subsequently, including creating database records and synchronizing database records, and the like. A developer can quickly design a data storage format by taking a user as a unit, and the design presentation is intuitive and understandable to other developers.

10 Claims, 3 Drawing Sheets

(51) Int. Cl.
  *G06F 16/23*   (2019.01)
  *G06F 16/26*   (2019.01)
  *A63F 13/60*   (2014.01)

(56) References Cited

U.S. PATENT DOCUMENTS

| | | | | |
|---|---|---|---|---|
| 2006/0224568 | A1* | 10/2006 | Debrito | G06F 16/2428 |
| 2007/0011192 | A1 | 1/2007 | Barton | |
| 2008/0040363 | A1* | 2/2008 | Tauscher | G06F 16/84 |
| 2010/0257507 | A1* | 10/2010 | Warren | G06F 8/40 |
| | | | | 345/619 |
| 2014/0214891 | A1* | 7/2014 | Quist | H04L 67/12 |
| | | | | 707/770 |
| 2016/0098848 | A1* | 4/2016 | Zamanakos | A61B 5/7275 |
| | | | | 345/440 |
| 2022/0020227 | A1* | 1/2022 | Zhou | G06T 19/20 |
| 2022/0405300 | A1* | 12/2022 | Wu | A63F 13/352 |

FOREIGN PATENT DOCUMENTS

| | | |
|---|---|---|
| CN | 102841892 | 12/2012 |
| CN | 103927168 | 7/2014 |
| CN | 107357942 | 11/2017 |

\* cited by examiner

VISUAL DATA OPERATION METHOD, SYSTEM, AND DEVICE, AND MEDIUM

CROSS REFERENCE TO RELATED APPLICATIONS

This application is a national phase of PCT application No. PCT/CN2020/114738, filed on Sep. 11, 2020, which claims priority from Chinese Patent Application No. 201911376869.5 filed on Dec. 27, 2019, all of which are incorporated herein by reference.

TECHNICAL FIELD

The present invention relates to the field of game development and editor technologies, and in particular, to a visual data operation method, system, and device, and a medium.

BACKGROUND

In professional game development software, a database usually needs to be set up, and operations such as insert/query/delete are performed on the database in game codes. These data operations are all implemented by codes.

For example, a developer has developed a game. Due to the rich game content and the relatively long game duration, when entering the game, the player does not want to restart the game but wants to keep the previous game progress, and therefore there are requirements for saving and reading data of game characters. If data saving and reading are implemented with codes in the development process, the process is more complicated and not friendly to the developer.

SUMMARY

An objective of the present invention is to provide a visual data operation method, system, and device, and a medium. Data and database records correspond to each other and are mutually converted by using value objects. A developer only needs to arrange the value objects as a tree structure, and a system can automatically complete remaining data operations subsequently, including creating database records and synchronizing database records, and the like. An ordinary developer can quickly design a data storage format by taking a user as a unit, and the design presentation is intuitive and understandable to other developers.

An embodiment of the present invention discloses a visual data operation method, wherein the method comprises:
  for one or more pieces of data, creating one or more corresponding value objects, and arranging the one or more value objects as a tree structure; and
  for the one or more value objects, creating corresponding database records, and defining fields of the database records by the one or more value objects.
  Optionally, the method further comprises:
  downloading the one or more value objects; and
  reading the database records, and assigning values to the downloaded one or more value objects.
  Optionally, the method further comprises:
  writing the one or more pieces of data in the one or more value objects;
  uploading the one or more value objects in which the data is written; and
  reading the uploaded one or more value objects, and updating the database records.
  Optionally, the method further comprises:
  when a value object is deleted, hiding a field defined by the deleted value object in the database record.
  Optionally, the method further comprises:
  when a value object is added, determining whether there are hidden fields in the database record;
  if there are no hidden fields in the database record, adding a field defined by the added value object in the database record, otherwise, determining whether the field defined by the added value object is the same as one of the hidden fields; and
  if the field defined by the added value object is different from any one of the hidden fields, adding the field defined by the added value object in the database record, otherwise, prompting whether to establish a corresponding relationship between the added value object and the hidden field which is the same as the field defined by the added value object.
  Optionally, the defining fields of the database records by the one or more value objects comprises:
  giving names to the fields of the database records by using names of the one or more value objects and hierarchical relationships of the one or more value objects in the tree structure.
  Optionally, the method further comprises:
  when a name of a value object and/or a hierarchical relationship of the one or more value objects in the tree structure is changed, changing a name of a field defined by the changed value object in the database record.
  Optionally, the one or more pieces of data are respectively associated with one or more identifiers, and each identifier defines a primary key of the database record.

An embodiment of the present invention discloses a visual data operation system, and the system comprises:
  a first creating module, configured to: for one or more pieces of data, create one or more corresponding value objects, and arrange the one or more value objects as a tree structure; and
  a second creating module, configured to: for the one or more value objects, create corresponding database records, and define fields of the database records by the one or more value objects.

An embodiment of the present invention discloses a visual data operation device, wherein the device comprises a memory storing computer-executable instructions and a processor, wherein the processor is configured to execute the instructions to implement a visual data operation method, wherein the method comprises:
  for one or more pieces of data, creating one or more corresponding value objects, and arranging the one or more value objects as a tree structure; and
  for the one or more value objects, creating corresponding database records, and defining fields of the database records by the one or more value objects.

An embodiment of the present invention discloses a computer storage medium encoded with a computer program, wherein the computer program comprises instructions, and the instructions are executed by one or more computers to implement a visual data operation method, wherein the method comprises:
  for one or more pieces of data, creating one or more corresponding value objects, and arranging the one or more value objects as a tree structure; and
  for the one or more value objects, creating corresponding database records, and defining fields of the database records by the one or more value objects.

Compared with the prior art, main differences and effects of the embodiment of the present invention are as follows:

In the present invention, data and database records correspond to each other and are mutually converted by using value objects. A developer only needs to arrange the value objects as a tree structure, and a system can automatically complete remaining data operations subsequently, including creating database records and synchronizing database records, and the like. An ordinary developer can quickly design a data storage format by taking a user as a unit, and the design presentation is intuitive and understandable to other developers.

DETAILED DESCRIPTION OF EMBODIMENTS

Figure 1:
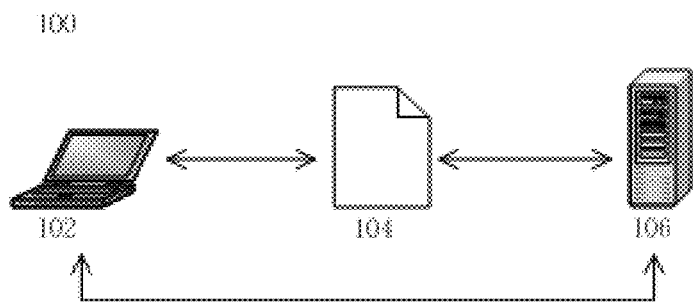
FIG. 1 is a schematic diagram of an application scenario of a visual data operation according to an embodiment of the present invention.

The present application is further described below with reference to specific embodiments and accompanying drawings. It should be understood that the specific embodiments described herein are only for explaining the present application, rather than limiting the present application. In addition, for the convenience of description, the drawings show only some but not all of the structures or processes related to the present application. It should be noted that in this description, similar numerals and letters indicate similar items in the following drawings.

It should be understood that, although the terms "first," "second," etc. may be used herein to describe various features, these features should not be limited by these terms. These terms are used for distinction only and should not be construed to indicate or imply relative importance. For example, a first feature could be termed a second feature, and, similarly, a second feature could be termed a first feature, without departing from the scope of example embodiments.

In the description of this application, it should further be noted that, unless otherwise expressly specified and limited, the terms "setting", "joint" and "connection" should be understood in a broad sense, for example, the connection may be a fixed connection or a detachable connection, or an integral connection; or may be a mechanical connection or an electrical connection; or may be a direct connection, or an indirect connection through an intermediate medium, or internal communication between two components. For a person of ordinary skill in the art, the specific meanings of the above terms in this embodiment can be understood in specific situations.

Illustrative embodiments of the present application comprise, but are not limited to, a visual data operation method, system, and device, and a media.

Various aspects of the illustrative embodiments are described by using terms commonly used by persons skilled in the art to convey the substance of their work to others skilled in the art. However, it is apparent to the persons skilled in the art that some alternative embodiments can be implemented by using some of the described features. For purposes of explanation, specific numbers and configurations are set forth in order to provide a more thorough understanding of the illustrative embodiments. However, it is apparent to the person skilled in the art that alternative embodiments may be practiced without the specific details. In some other instances, well-known features are omitted or simplified herein in order to avoid obscuring the illustrative embodiments of the application.

Furthermore, various operations are described as multiple operations separate from each other in a manner that is most helpful in understanding the illustrative embodiments. However, the order of description should not be construed to imply that these operations are necessarily dependent on the order of description, and many of the operations may be performed in parallel, concurrently, or simultaneously. In addition, the order of operations can also be rearranged. The process may be terminated when the described operations are complete, but additional steps not comprised in the drawings may further be comprised. The process may correspond to a method, a function, a procedure, a subroutine, a subprogram, and the like.

References to "one embodiment," "an embodiment," "an illustrative embodiment," etc. in the description indicate that the described embodiment may comprise a particular feature, structure, or property, but each embodiment may or may not comprise a particular characteristic, structure or property. Moreover, these phrases are not necessarily referring to the same embodiment. Furthermore, when certain features are described with reference to specific embodiments, the knowledge of the persons skilled in the art can influence the combination of those features with other embodiments, regardless of whether or not those embodiments are explicitly described.

Unless otherwise specified in the context, the terms "comprising", "having" and "including" are synonyms. The phrase "A and/or B" indicates "(A), (B) or (A and B)".

As used herein, the term "module" may refer to, as a part of, or comprise: a memory (shared, dedicated, or group) for running one or more software or firmware programs, an application specific integrated circuit (ASIC), an electronic circuit and/or a processor (shared, dedicated, or group), a combinational logic circuit, and/or another suitable component that provide the described functionality.

In the drawings, some structural or method features may be shown in specific arrangements and/or sequences. It should be understood, however, that such specific arrangement and/or ordering are not necessarily required. Rather, in some embodiments, these features may be described in a manner and/or order different from that shown in the illustrative drawings. Additionally, structural or method features comprised in a particular figure does not imply that such features need to be comprised in all embodiments, and in some embodiments such features may not be comprised or may be combined with other features.

In order to make the objectives, technical solutions and advantages of the present application clearer, the embodiments of the present application are further described in detail below with reference to the accompanying drawings.

FIG. 1 is a schematic diagram of an application scenario of a visual data operation according to an embodiment of the present invention.

As shown in FIG. 1, an application scenario 100 comprises a device 102, an application 104, and a server 106. The device 102, the application 104 and the server 106 communicate with each other.

The device 102 may be a terminal device used by a user, comprising but not limited to a terminal device such as a desktop computer, a laptop computer, a tablet computer, a cell phone, a wearable device, a head mounted display, a portable game console, a portable music player, a reader device, a personal digital assistant, a virtual reality or augmented reality device, and a television embedded or coupled with one or more processors. This is not limited herein.

The application 104 may be a software application used by the user, comprising but not limited to a game application. This is not limited herein.

The server 106 comprises, but is not limited to, one or more servers and cloud servers. This is not limited herein.

Figure 2:
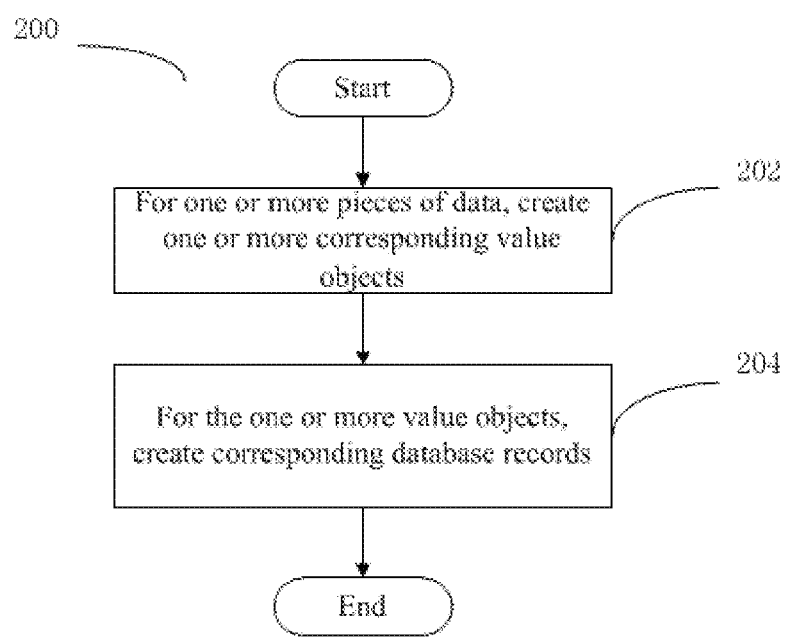
FIG. 2 is a flowchart of a visual data operation method according to an embodiment of the present invention.

FIG. 2 is a flowchart of a visual data operation method according to an embodiment of the present invention.

As shown in FIG. 2, the method 200 comprises the following steps:

Step 202: For one or more pieces of data, create one or more corresponding value objects, and arrange the one or more value objects as a tree structure.

Step 204: For the one or more value objects, create corresponding database records, and define fields of the database records by the one or more value objects.

Figure 3A:
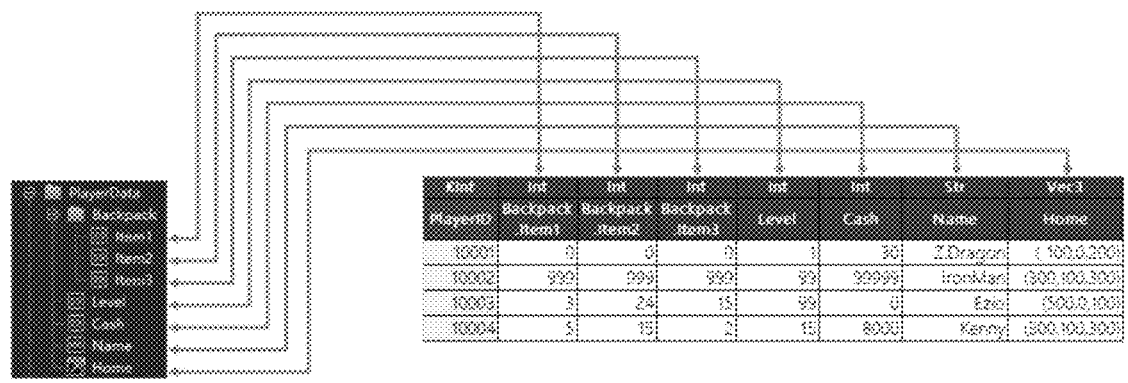
FIG. 3A and FIG. 3B are schematic diagrams of value objects and database records according to an embodiment of the present invention.
Figure 3B:
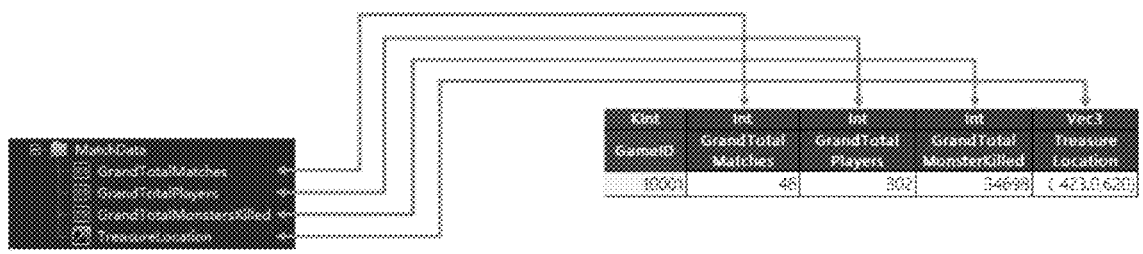

FIG. 3A and FIG. 3B are schematic diagrams of value objects and database records according to an embodiment of the present invention.

With reference to FIG. 1, FIG. 3A and FIG. 3B, in the application scenario 100, for example, when a player plays a game by using the device 102, one or more pieces of data may be generated. The data may comprise player data and match data. The player data is associated with a player identifier (for example, a player ID), and player data between players can be isolated from each other. When the player joins the game by using the device 102, the player data can be read from the server 106. When the player leaves the game by using the device 102 (for example, actively leaves the game, or goes offline because no operation is performed for a long time), the player data may be uploaded to the server 106. The match data is associated with a match identifier (for example, a match ID) and can be shared by the players. When the player plays a game by using the device 102, the match data (real-time data) can be read from the server 106, and the match data can be uploaded to the server 106 (atomic operation).

For one or more pieces of data, for example, a game developer may create one or more corresponding value objects in the application 104, and arrange the one or more value objects as a tree structure. One or more value objects corresponding to the player data may comprise item 1 (Item1), item 2 (Item2), item 3 (Item3), level (Level), cash (Cash), name (Name) and home (Home), and the like. One or more value objects corresponding to the match data may comprise grand total matches (GrandTotalMatches), grand total players (GrandTotalPlayers), grand total monster that are skilled (GrandTotalMonstersKilled), treasure location (TreasureLocation), and the like. The one or more value objects may comprise any value-type value objects, comprising but not limited to IntValue, FloatValue, StringValue, Vector2Value, Vector3Value, and the like, and may not comprise a reference-type value object. The one or more value objects may be arranged as a tree structure and arranged in folders, and the one or more value objects respectively corresponding to the player data and the match data may be respectively arranged in a player data folder (PlayerData) and a match data folder (MatchData). The player data folder (PlayerData) and the match data folder (MatchData) can be of a storage folder type (StorageFolder).

For the one or more value objects, the server 106 may create corresponding database records, and define fields of the database records by the one or more value objects.

In the present invention, data and database records correspond to each other and are mutually converted by using value objects. A developer only needs to arrange the value objects as a tree structure, and a system can automatically complete remaining data operations subsequently, including creating database records and synchronizing database records, and the like. An ordinary developer can quickly design a data storage format by taking a user as a unit, and the design presentation is intuitive and understandable to other developers.

According to some embodiments of the present application, the method further comprises:
downloading the one or more value objects; and
reading the database records, and assigning values to the downloaded one or more value objects.

As shown in FIG. 1, in the application scenario 100, for example, when a player joins a game by using the device 102, the device 102 may download the one or more value objects from the application 104. Additionally, the device 102 may read the database records from the server 106 and may assign values to the downloaded one or more value objects. Therefore, in the present invention, the previous game progress of the player can be retained, and there is no need to restart the game.

According to some embodiments of the present application, the method further comprises:
writing the one or more pieces of data in the one or more value objects;
uploading the one or more value objects in which the data is written; and
reading the uploaded one or more value objects, and updating the database records.

As shown in FIG. 1, in the application scenario 100, for example, when the player leaves the game by using the device 102, the device 102 can write the one or more pieces of data generated in the game in the one or more value objects. Additionally, the device 102 may upload, to the server 106, the one or more value objects in which the data is written. The server 106 can read the uploaded one or more value objects and can update the database records. Therefore, in the present invention, the game progress of the player can be updated.

According to some embodiments of the present application, the method further comprises:
when a value object is deleted, hiding a field defined by the deleted value object in the database record.

As shown in FIG. 1, in the application scenario 100, for example, a game developer may delete one or more value objects in the application 104 (for example, when updating a game), or a player may delete the downloaded one or more value objects. On the server 106 side, fields defined by the deleted value objects can be hidden in the database record, and by hiding the fields, the fields can be restored in case of accidental deletion. Additionally, when one or more value objects are deleted, the user may be asked to confirm whether to delete the value objects. Therefore, in the present invention, the game developer or the player is allowed to delete value objects and correspondingly update the database record.

According to some embodiments of the present application, the method further comprises:
when a value object is added, determining whether there are hidden fields in the database record;

if there are no hidden fields in the database record, adding a field defined by the added value object in the database record, otherwise, determining whether the field defined by the added value object is the same as one of the hidden fields; and if the field defined by the added value object is different from any one of the hidden fields, adding the field defined by the added value object in the database record, otherwise, prompting whether to establish a corresponding relationship between the added value object and the hidden field which is the same as the field defined by the added value object.

As shown in FIG. 1, in the application scenario 100, a game developer may add one or more value objects in the application 104 (for example, when updating the game), or a player may add one or more value objects. On the server 106 side, it can be determined whether there are hidden fields in the database record first, because if there are hidden fields, a field defined by the added value object may be the same as one of the hidden fields; if there are no hidden fields in the database record, the field defined by the added value object can be added in the database record, otherwise it can be determined whether the field defined by the added value object is the same as one of the hidden fields; if the field defined by the added value object is different from any one of the hidden fields, the field defined by the added value object can be added in the database record, otherwise it can be prompted whether to establish a corresponding relationship between the added value object and the hidden field which is the same as the field defined by the added value object; if a corresponding relationship between the added value object and the hidden field which is the same as the field defined by the added value object is not established, it can be prompted whether to modify the added value object. Therefore, in the present invention, the game developer or the player is allowed to add value objects, and correspondingly update the database record.

According to some embodiments of the present application, the defining fields of the database records by the one or more value objects comprises:

giving names to the fields of the database records by using names of the one or more value objects and hierarchical relationships of the one or more value objects in the tree structure.

As shown in FIG. 1, FIG. 3A and FIG. 3B, in the application scenario 100, for one or more pieces of data, for example, a game developer can create one or more corresponding value objects in the application 104, and arrange the one or more value objects as a tree structure. In order to organize and summarize the value objects, value objects of item1 (Item1), item2 (Item2) and item3 (Item3) can be uniformly arranged under a back pack folder (Backpack), while value objects of the back pack folder (Backpack), level (Level), cash (Crash), name (Name), and home (Hone) can be arranged in a player data folder (PLayerData). Value objects of grand total matches (GrandTotalMatches), grand total players (GrandTotalPlayers), grand total monsters that are killed (GrandTotalMonstersKilled) and treasure location (TreasureLocation) can be arranged in a match data folder (MatchData).

For one or more value objects, the server 106 may create corresponding database records, and define fields of the database records by the one or more value objects. The server 106 may give names to the fields of the database records by using names of the one or more value objects and hierarchical relationships of the one or more value objects in the tree structure. A naming rule can be as follows: The name of the field is named by connecting, by using dot characters, a continuous structure from a name of an ancestor node for a child node of a player data folder (PlayerData) or a match data folder (MatchData) to a name of a node of the value object. Corresponding to the value objects of item 1 (Item1), item 2 (Item2) and item 3 (Item3), names of the fields of the database records are Backpack·Item1, Backpack·Item2 and Backpack. Item3 respectively, and corresponding to value objects of level (Level), cash (Cash), name (Name) and home (Home), names of the fields of the database records are Level, Cash, Name and Home respectively. Corresponding to value objects of grand total matches (GrandTotalMatches), grand total players (GrandTotalPlayers), grand total monsters that are killed (GrandTotalMonstersKilled) and treasure location (TreasureLocation), names of the fields of the database records are GrandTotalMatches, GrandTotalPlayers, GrandTotalMonstersKilled and TreasureLocation respectively. Therefore, the corresponding relationship between the data, the value object and the database record of the present invention can be visualized and understood intuitively.

According to some embodiments of the present application, the method further comprises:

when a name of a value object and/or a hierarchical relationship of the one or more value objects in the tree structure is changed, changing a name of a field defined by the changed value object in the database record.

As shown in FIG. 1, in the application scenario 100, for example, the game developer can change the names of the one or more value objects and/or the hierarchical relationships of the one or more value objects in the tree structure in the application 104 (for example, when updating the game), or the player can change the names of the one or more value objects and/or the hierarchical relationships of the one or more value objects in the tree structure. On the server 106 side, the name of the field defined by the changed value object can be changed in the database record. The name of the field defined by the changed value object can be changed in the database record according to the above naming rule. Therefore, in the present invention, the game developer or the player is allowed to change the name of the value object and/or the hierarchical relationship of the one or more value objects in the tree structure, and correspondingly update the database record.

According to some embodiments of the present application, the one or more pieces of data are respectively associated with one or more identifiers, and each identifier defines a primary key of the database record.

As shown in FIG. 1, in the application scenario 100, the one or more pieces of data are respectively associated with one or more identifier, and the server 106 can define a primary key of the database record by each identifier. As described above, the player data is associated with a player identifier (for example, a player ID), and the match data is associated with a match identifier (for example, a match ID). For example, when a player joins a game by using the device 102, a database record corresponding to a player ID of the current player may be read from the server 106. For example, when the player leaves the game by using the device 102, a database record corresponding to the player ID of the current player may be updated in the server 106. For example, when a player plays a game by using the device 102, the database record corresponding to a match ID of the current game can be read from the server 106, and a database record corresponding to the match ID of the current game can be updated in the server 106.

According to some embodiments of the present application, that a primary key of a database record is defined by each identifier comprises:

A name is given to the primary key of the database record by using the name of the identifier.

As shown in FIG. 1, FIG. 3A, and FIG. 3B, in the application scenario 100, the server 106 can give a name to the primary key of the database record by using the name of the identifier. Corresponding to the player identifier, the name of the primary key of the database record may be PlayerID. Corresponding to the match identifier, the name of the primary key of the database record may be GameID. Player data of the first to fourth players may be stored in the server 106 in the form of a list, respectively, and match data of the game may be stored in the server 106 in the form of a list.

Figure 4:
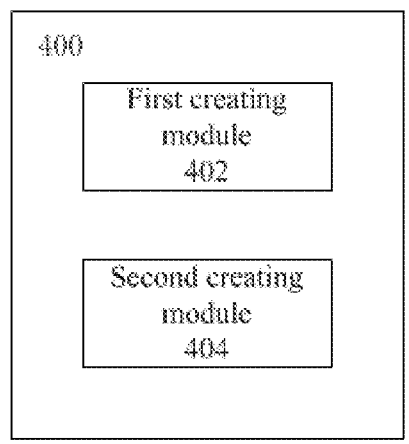
FIG. 4 is a structural diagram of a visual data operation system according to an embodiment of the present invention.

FIG. 4 is a structural diagram of a visual data operation system according to an embodiment of the present invention.

As shown in FIG. 4, the system comprises:
- a first creating module 402, configured to: for one or more pieces of data, create one or more corresponding value objects, and arrange the one or more value objects as a tree structure; and
- a second creating module 404, configured to: for the one or more value objects, create corresponding database records, and define fields of the database records by the one or more value objects.

According to some embodiments of the present application, a visual data operation device is disclosed. The device comprises a memory storing computer-executable instructions and a processor, and the processor is configured to execute the instructions to implement a visual data operation method. The method comprises:
- for one or more pieces of data, creating one or more corresponding value objects, and arranging the one or more value objects as a tree structure; and
- for the one or more value objects, creating corresponding database records, and defining fields of the database records by the one or more value objects.

According to some embodiments of the present application, a computer storage medium encoded with a computer program is disclosed. The computer program comprises instructions, and the instructions are executed by one or more computers to implement a visual data operation method. The method comprises:
- for one or more pieces of data, creating one or more corresponding value objects, and arranging the one or more value objects as a tree structure; and
- for the one or more value objects, creating corresponding database records, and defining fields of the database records by the one or more value objects.

In some cases, the disclosed embodiments may be implemented in hardware, firmware, software, or any combination thereof. The disclosed embodiments may further be implemented in the form of instructions or programs carried or stored on one or more transitory or non-transitory machine-readable (for example, computer-readable) storage media, and the instructions and programs may be read and executed by one or more processors. When the instructions or programs are executed by a machine, the machine can perform the various methods described above. For example, the instructions may be distributed over a network or other computer-readable medium. Therefore, the machine-readable medium may comprise, but is not limited to, any mechanism for storing or transmitting information in a machine (for example, computer)-readable form, such as a floppy disk, an optical disk, a compact disc read-only memory (CD-ROM), a magneto-optical disk, a read only memory (ROM), a random access memory (RAM), an erasable programmable read only memory (EPROM), an electronically erasable programmable read only memory (EEPROM), a magnetic or optical card, or a flash memory or a tangible machine-readable memory that transmits network information through electrical signals, optical signals, acoustic signals, or other forms of signals (for example, carrier waves, infrared signals, and digital signals). Therefore, the machine-readable medium comprises any form of machine-readable medium suitable for storage or transmission of electronic instructions or machine (for example, computer)-readable information.

The embodiments of the present application are described in detail above with reference to the accompanying drawings, but the application of the technical solutions of the present application is not limited to the various applications mentioned in the embodiments of the present patent, and various structures and modifications can be easily implemented by referring to the technical solutions of the present application, to achieve the various beneficial effects mentioned herein. Within the scope of knowledge possessed by a person of ordinary skill in the art, various changes made without departing from the purpose of the present application shall all belong to the scope of the patent of the present application.

The invention claimed is:

1. A visual data operation method, wherein the method comprises:
   for one or more pieces of data, creating one or more corresponding value objects and arranging the one or more value objects as a tree structure;
   for the one or more value objects, creating corresponding database records and defining fields of the database records by the one or more value objects, wherein
   when a value object is added, determining whether there are hidden fields in the database record;
   if there are no hidden fields in the database record, adding a field defined by the added value object in the database record, otherwise, determining whether the field defined by the added value object is the same as one of the hidden fields; and
   if the field defined by the added value object is different from any one of the hidden fields, adding the field defined by the added value object in the database record, otherwise, prompting whether to establish a corresponding relationship between the added value object and the hidden field which is the same as the field defined by the added value object.

2. The method according to claim 1, wherein the method further comprises:
   when a value object is deleted, hiding a field defined by the deleted value object in the database record.

3. The method according to claim 1, wherein the defining fields of the database records by the one or more value objects comprises:
   giving names to the fields of the database records by using names of the one or more value objects and hierarchical relationships of the one or more value objects in the tree structure.

4. The method according to claim 3, wherein the method further comprises:
   when a name of a value object and/or a hierarchical relationship of the one or more value objects in the tree structure is changed, changing a name of a field defined by the changed value object in the database record.

5. The method according to claim 1, wherein the one or more pieces of data are respectively associated with one or more identifiers, and each identifier defines a primary key of the database record.

6. The method according to claim 1, wherein the method further comprises: downloading the one or more value objects; and
reading the database records and assigning values to the downloaded one or more value objects.

7. The method according to claim 1, wherein the method further comprises:
writing the one or more pieces of data in the one or more value objects;
uploading the one or more value objects in which the data is written; and
reading the uploaded one or more value objects and updating the database records.

8. A visual data operation system that comprises:
a first creating module that includes a non-transitory memory storing computer-executable instructions and a processor, which processor is configured to execute the stored instructions to implement a visual data operation method in accordance with claim 1 to create one or more corresponding value objects for one or more pieces of data and to arrange the one or more value objects as a tree structure; and
a second creating module that includes a non-transitory memory storing computer-executable instructions and a processor which is configured to execute the stored instructions to implement a visual data operation method in accordance with claim 1 to create corresponding database records for the one or more value objects and to define fields of the database records by the one or more value objects.

9. A visual data operation device, wherein the device comprises a memory storing computer-executable instructions and a processor, wherein the processor is configured to execute the instructions to implement a visual data operation method in accordance with claim 1.

10. A non-transitory computer storage medium encoded with a computer program, wherein the computer program comprises instructions, and the instructions are executed by one or more computers to implement a visual data operation method in accordance with claim 1.

* * * * *